United States Patent
Zhan et al.

(10) Patent No.: US 11,474,277 B2
(45) Date of Patent: Oct. 18, 2022

(54) ACQUIRING FORMATION POROSITY USING MULTIPLE DUAL-FUNCTION DETECTORS AND NEURAL NETWORK

(71) Applicant: CHINA PETROLEUM & CHEMICAL CORPORATION, Beijing (CN)

(72) Inventors: Sheng Zhan, Houston, TX (US); Jeremy Zhang, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 0 days.

(21) Appl. No.: 17/465,657

(22) Filed: Sep. 2, 2021

(65) Prior Publication Data
US 2022/0252755 A1    Aug. 11, 2022

Related U.S. Application Data

(60) Provisional application No. 63/148,571, filed on Feb. 11, 2021, provisional application No. 63/148,573, filed on Feb. 11, 2021.

(51) Int. Cl.
| | | |
|---|---|---|
| *G01V 5/10* | (2006.01) | |
| *G01V 5/04* | (2006.01) | |
| *E21B 47/017* | (2012.01) | |
| *E21B 49/00* | (2006.01) | |

(52) U.S. Cl.
CPC .......... *G01V 5/102* (2013.01); *E21B 47/017* (2020.05); *E21B 49/00* (2013.01); *G01V 5/045* (2013.01); *G01V 5/105* (2013.01)

(58) Field of Classification Search
CPC ........ G01V 5/102; G01V 5/045; G01V 5/105; E21B 47/017; E21B 49/00
See application file for complete search history.

(56) References Cited

U.S. PATENT DOCUMENTS

| | | |
|---|---|---|
| 5,349,184 A | 9/1994 | Wraight |
| 7,525,100 B2 | 4/2009 | Kraemer et al. |
| 7,633,058 B2 | 12/2009 | Stoller et al. |
| 7,910,894 B2 | 3/2011 | Kraemer et al. |
| 8,598,510 B2 | 12/2013 | Zhang et al. |
| 8,849,573 B2 | 9/2014 | Zhang et al. |
| 9,012,836 B2 | 4/2015 | Wilson et al. |
| 9,477,006 B2 | 10/2016 | Zhou et al. |

(Continued)

*Primary Examiner* — David P Porta
*Assistant Examiner* — Fani Polyzos Boosalis
(74) *Attorney, Agent, or Firm* — Novick, Kim & Lee, PLLC; Allen Xue (57) ABSTRACT

A method and apparatus of logging downhole formation and obtaining formation porosity using a pulsed neutron generator and multiple dual-function detectors that detect both neutrons and gamma rays. Ratios of thermal neutrons, epithermal neutrons, and capture gamma rays from multiple detectors are utilized to obtain neutron porosity, gamma porosity and formation porosity by using a trained neural network. The method can provide formation porosity measurements independent of environmental factors, such as borehole size, tool standoff, salinity, temperature, pressure, etc. Effects from environmental factors can be automatically corrected by employing multiple dual-function detectors that detect both neutrons and gamma rays.

17 Claims, 10 Drawing Sheets

(56) References Cited

U.S. PATENT DOCUMENTS

| | | |
|---|---|---|
| 9,835,759 B2 | 12/2017 | Grau |
| 10,061,056 B2 | 8/2018 | Moake |
| 10,379,253 B2 | 8/2019 | Zhou et al. |
| 2006/0075223 A1 | 4/2006 | Bade et al. |
| 2006/0192096 A1 | 8/2006 | Radtke et al. |
| 2009/0045329 A1 | 2/2009 | Stoller |
| 2011/0112810 A1 | 5/2011 | Scoullar et al. |
| 2011/0224906 A1* | 9/2011 | Zhang ............... G01V 5/04 702/11 |
| 2013/0206972 A1 | 8/2013 | Zhou et al. |
| 2014/0001350 A1* | 1/2014 | Beekman ............. G01V 5/102 250/269.6 |
| 2016/0154141 A1 | 6/2016 | Moake |
| 2017/0176635 A1 | 6/2017 | Kramer |
| 2017/0211382 A1 | 7/2017 | Jacobson et al. |
| 2017/0315260 A1 | 11/2017 | Stoller |
| 2017/0362931 A1 | 12/2017 | Homan et al. |
| 2018/0164469 A1 | 6/2018 | Kuespert |
| 2018/0172876 A1 | 6/2018 | Inanc et al. |
| 2018/0231683 A1 | 8/2018 | Teague et al. |

\* cited by examiner

ACQUIRING FORMATION POROSITY USING MULTIPLE DUAL-FUNCTION DETECTORS AND NEURAL NETWORK

RELATED APPLICATIONS

This application claims the benefit of priority under 35 U.S.C. § 119 to U.S. Provisional Application No. 63/148,571, filed on Feb. 11, 2021, and U.S. Provisional Application No. 63/148,573, filed on Feb. 11, 2021, the entire contents of which are incorporated herein by reference.

BACKGROUND

1. Field of Technology

This disclosure provides methods and apparatus for logging downhole formation from a borehole, particularly methods and apparatus using multiple dual-function detectors that detect both neutrons and gamma rays and neural network for data analysis. This disclosure provides an accurate formation porosity measurement with minimal interferences from environmental factors, such as borehole size, tool standoff, salinity, temperature, pressure etc.

2. Description of Related Art

In oil and gas exploration, density, porosity, mineralogy, and gas/oil saturation are important formation parameters for evaluating the total oil/gas reserves in a field. Various wireline and LWD (Logging-While-Drilling) logging tools have been developed to obtain downhole formation parameters.

Formation density is obtained by measuring back-scattered gamma rays from a gamma radiation source (e.g., a Cs-137 source) received at two detectors (e.g., two NaI scintillation detectors) placed at different distances from the gamma ray source inside a density tool. These two detectors are usually referred as the near detector and the far detector according to their relative distances from the gamma ray source.

Neutron porosity logging tools investigate the formation porosity by measuring the ratio of neutron count rates from a near detector to that of a far detector after fast neutrons from an isotope neutron source (e.g., an Am-Be source) slowed down by tool surroundings (e.g., wellbore fluid and formation) and scattered back to the detectors. The ratio is then translated to porosity according to the specific formation mineralogy (e.g., sandstone, limestone, or dolomite). Using the ratio of count rates from two detectors reduces the effect of variations in the near-wellbore environment (wellbore fluid, borehole size, etc.) on the porosity measurement.

A pulsed neutron logging tool employs a pulsed neutron source (e.g., a D-T neutron generator) and one, two, or three detectors that detect neutron-induced gamma rays. The energy spectrum of neutron-induced gamma rays from each element is unique. Therefore, by measuring the energy spectrum of gamma rays from inelastic scattering and/or from neutron capture reactions, one may identify the elements in the formation and obtain the relative percentage of gamma rays from each of those elements in the formation, i.e., the elemental yields. The inelastic spectrum is the basis for the carbon-oxygen (C/O) ratio log but can also provide information on other elements, such as hydrogen (H), silicon (Si), calcium (Ca), iron (Fe), sulfur (S), and chlorine (Cl).

Since the elemental yield logs only provide the relative concentration of elements, they are normally presented as ratios, such as C/O, Cl/H, Si/(Si+Ca), H/(Si+Ca), and Fe/(Si+Ca). These ratios are indicators of oil, salinity, mineralogy, porosity, and clay, respectively. The elemental yield logs, together with cross sections of neutron inelastic scattering and neutron capture reactions of those elements, can also be used to obtain element concentrations in the formation.

Further, by measuring thermal neutron time-decay curve or capture gamma ray time-decay curve after a neutron pulse or several neutron pulses, one may obtain the macro thermal neutron absorption cross section (sigma) of the formation, which can be utilized to estimate oil/gas saturation.

In most of these applications, neutrons and gamma rays are detected by their respectively detectors/sensors. For example, He-3 gaseous detectors are used to detect thermal neutrons. He-3 isotope has high thermal neutron absorption cross sections. After fast neutrons emitted from a neutron source are slowed down by the formation and scattered back to the detectors, neutrons are absorbed and produce other detectable ions, such as protons (p) and trilliums (T), which ionize the gas. Ions and electrons are multiplied and drifted in an electric field to form electric signals. A variety of scintillation detectors, e.g., NaI, CsI, BGO, GSO, LaBr3, YAP scintillators and photomultiplier tubes (PMTs), are employed to detect gamma rays. These scintillators change the deposited energy of gamma rays into scintillation lights. The PMT converts the scintillation lights into electrons and amplifies them to form electronic signals.

Existing pulsed neutron logging tools usually employ single-function detectors that detect either neutrons or gamma rays. For example, to obtain both formation density and neutron porosity, the traditional way is to combine a density tool and a neutron porosity tool together in the tool string. A density tool has a gamma ray source and two gamma ray detectors. A neutron porosity tool has a neutron source and two neutron detectors. As such, two different radiation sources and four radiation detectors would be required for formation density and neutron porosity measurements. To obtain other parameters such as gas saturation requires a third detector. Further, a neutron monitor detector may be needed to monitor the source strength of a neutron generator as the source strength may decrease or fluctuate over time. Accordingly, a pulsed neutron logging tool needs to carry multiple different types of radiation sources and detectors to measure multiple formation parameters. Such logging tools have limited use due to high cost, low reliability, and large size.

Formation porosity can be obtained by a neutron porosity tool, which usually has a neutron source and two neutron detectors spaced at different distances from the source. The source can be an isotope neutron source (e.g., an Am-Be source). The neutron detectors can detect either thermal neutrons or epithermal thermal neutrons. The ratio of count rates from a near detector to that of a far detector (near-to-far ratio) is then translated into porosity according to a specific formation mineralogy (e.g., sandstone, limestone, or dolomite).

It is well known that the measured near-to-far ratio is affected by the near-wellbore environmental factors, such as borehole size, tool standoff, salinity, temperature, pressure etc. Therefore, the porosity measurement is affected by the near-wellbore environment as well. US 2011/0224906 discloses methods to obtain the formation porosity by using a trained neural network by simultaneously using the near-to-far ratio and all those environmental measurements as inputs. However, obtaining those environmental measurements would require additional sensors, such as acoustic sensors for tool standoff measurement, temperature sensors for the temperature measurement, and pressure sensors for pressure measurements. Using those additional sensors make the neutron porosity measurement susceptible to the failure of those sensors.

Figure 1A:
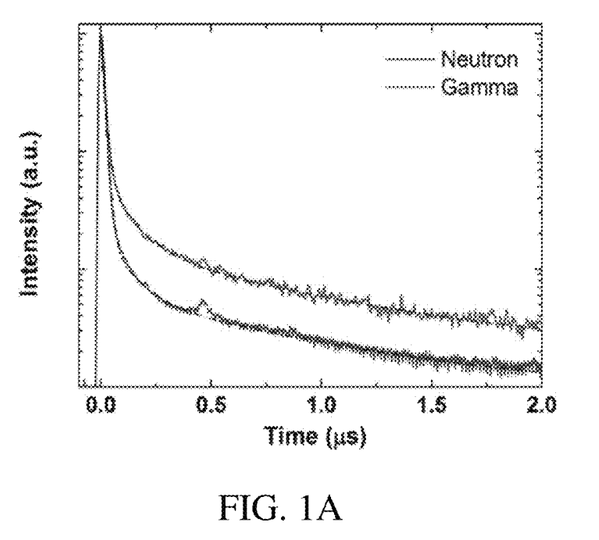
FIG. 1A compares the decay of the signal induced by gamma ray in a detector with the decay of the signal from neutron.
Figure 1B:
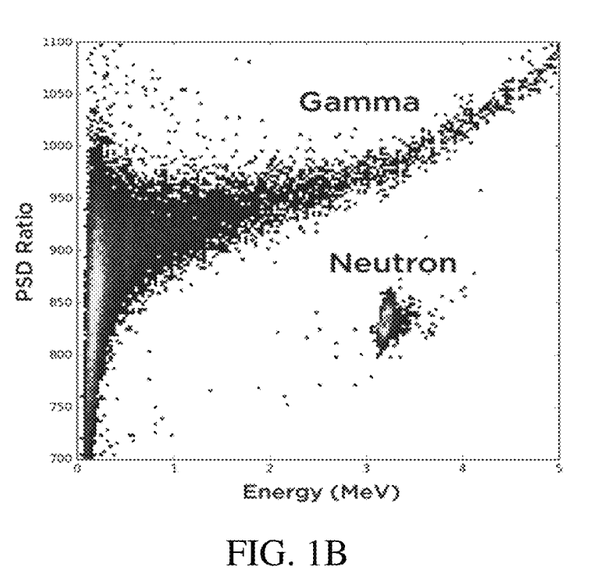
FIG. 1B illustrates the cross-plot of pulse shape discrimination (PSD) versus energy to separate neutrons and gamma rays.

More recently, scintillator materials that are sensitive to both neutrons and gamma rays, e.g., $Cs_2LiYCl_6$ (CLYC), $Cs_2LiLaBr_6$ (CLLB), have been developed. By coupling crystals of such a material to scintillation light sensitive components, such as PMTs, one can produce dual-function scintillators that detect both neutrons and gamma rays. Neutrons and gamma rays received by the dual-function detectors can be distinguished from each other using the pulsed shape discrimination (PSD) technique based on the fact that the electronic signal from a detector due to a gamma ray decays faster than a neutron, shown in FIG. 1A and FIG. 1B.

There are needs to reduce the number of radiation sources and detectors as well as to improve accuracy and precision of formation parameters obtained by a logging tool in either wireline or LWD environments. The disclosure provides methods for measuring and calculating formation porosity using a neural network.

SUMMARY

The present disclosure teaches methods and apparatus of obtaining an improved real-time formation porosity measurement in either wireline or logging-while-drilling (LWD) environment, without measuring those environmental factors. Moreover, the effects on the formation porosity measurement from those environmental factors can be automatically corrected during the wireline logging or the LWD operations by using a neural network.

One embodiment of the disclosure is a method of evaluating downhole formation porosity. The method includes using a pulsed neutron source and multiple dual-function sensors conveyed in a wellbore to make a measurement indicative of formation porosity. A trained neural network is utilized to estimate the value of formation porosity by simultaneously using the measurements from multiple sensors and performing further data processing.

Another embodiment of the disclosure is an apparatus configured to evaluate downhole formation porosity. The apparatus includes using a pulsed neutron source and multiple dual-function sensors conveyed in a wellbore to make a measurement indicative of a property of formation porosity. A trained neural network is utilized to estimate the value of formation porosity by simultaneously using the measurements from multiple sensors and performing further data processing.

A further embodiment provides a method for evaluating downhole formation porosity. The method includes steps of deploying a pulsed neutron logging tool into a well bore in an earth formation; emitting neutrons from the pulsed neutron logging tool into the earth formation; detecting neutrons and gamma rays using a plurality of detectors in the pulsed neutron logging tool; determining ratios of neutron count rates and ratios of gamma ray count rates amongst the plurality of the detectors; inputting the ratios of neutron count rates, the ratios of gamma ray count rates, or both to a neural network to obtain one or more formation porosities. Each of the plurality of detectors is a dual-function detector configured to detect neutrons and gamma rays from the earth formation.

In still a further embodiment, the method includes steps of inputting the ratios of neutron count rates and a plurality of formation parameters into the neural network; and calculating a first formation porosity and further inputting the ratios of gamma ray rates and a plurality of formation parameters into the neural network; and calculating a second formation porosity.

In an additional embodiment, the neutron logging tool has three or more detectors, including a first detector disposed at a first distance from the neutron source, a second detector disposed at a second distance from the neutron source, a third detector disposed at a third distance from the neutron source, wherein the second distance is longer than the first distance, and the third distance is longer than the second distance The data of neutron count rates, gamma ray count rates, ratios of neuron count rates, ratios of gamma ray count rate are further processed by the firmware inside the pulsed neutron logging tool or transmitted to surface.

BRIEF DESCRIPTION OF THE DRAWINGS

The teachings of the present invention can be readily understood by considering the following detailed description in conjunction with the accompanying drawings.

DETAILED DESCRIPTION OF THE DISCLOSURE

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In this disclosure, unless otherwise noted, a detector refers to a dual-function detector that can detect both neutrons and gamma rays. Such a detector employs a scintillation crystal such as $Cs_2LiLaBr_6$ (CLLB) and light sensitive device, e.g., a PMT. The detectors may be actively cooled or not actively cooled when being deployed downhole. For example, a detector using a CLLB crystal and a high-temperature PMT can be used at a high temperature without cooling.

This disclosure provides methods and apparatus that improve the estimation of formation porosity after drilling (wireline logging) or during drilling operation (logging-while-drilling).

Figure 2A:
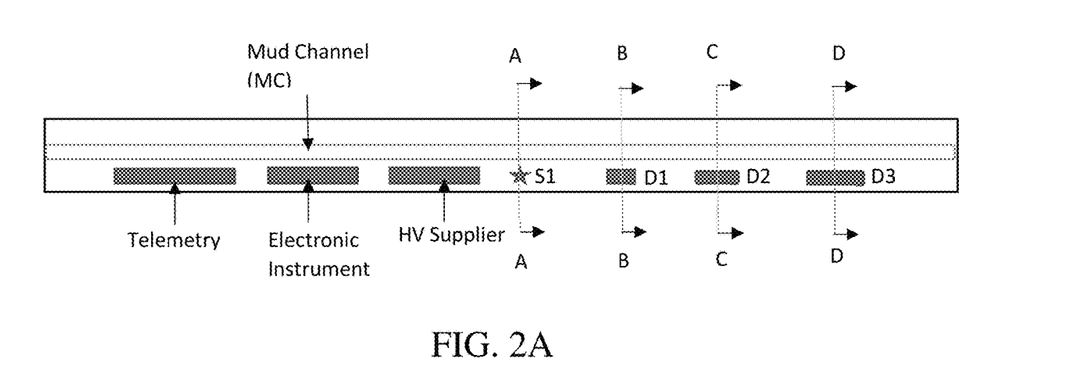
FIG. 2A, FIG. 2B, FIG. 2C, and FIG. 2D illustrate four exemplary configurations of a pulsed neutron logging tool having one neutron source (Si) and three detectors (D1, D2, and D3) disposed along the longitudinal direction of the housing of the tool.

FIGS. 2A to 2D are schematic illustrations (not to scale) of four exemplary configurations of a cylindrical pulsed neutron logging tool 200 having a pulsed neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 2A also shows a high voltage power supply (HV), an electronic instrument, e.g., a controller, for sending instructions, receiving and processing data from the pulsed neutron source and the detectors, as well as a telemetry for transmitting data between the logging tool and surface. The high voltage power supply provides power to detectors (D1, D2, D3) and to the pulsed neutron source (S1). The power supply, the electronic instrument, and telemetry are required but not shown in FIGS. 2B-2D for simplicity.

As shown in the figures, D1 is the near detector that has the shortest distance in longitudinal direction to the pulsed neutron source. D3 is the far detector having the longest longitudinal distance to the pulsed neutron source, and D2 is the middle detector that has a longitudinal distance that is in the middle.

Figure 2B:
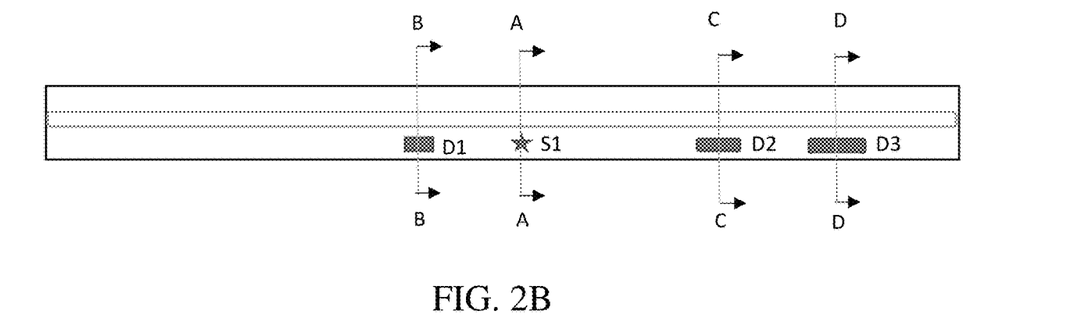
Figure 2C:
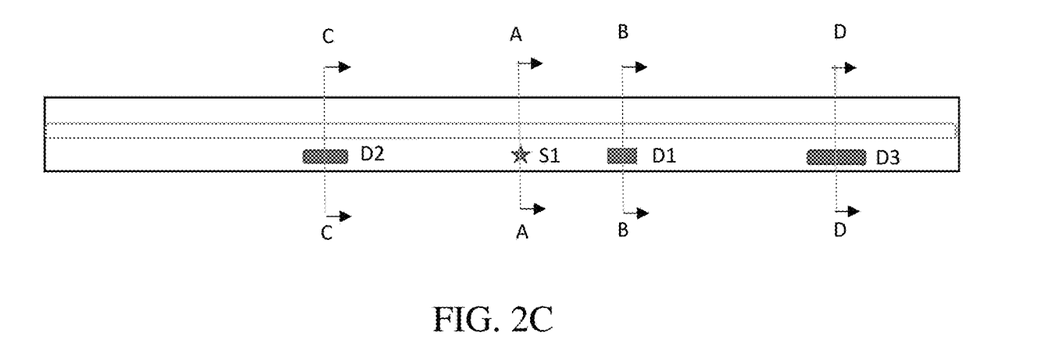
Figure 2D:
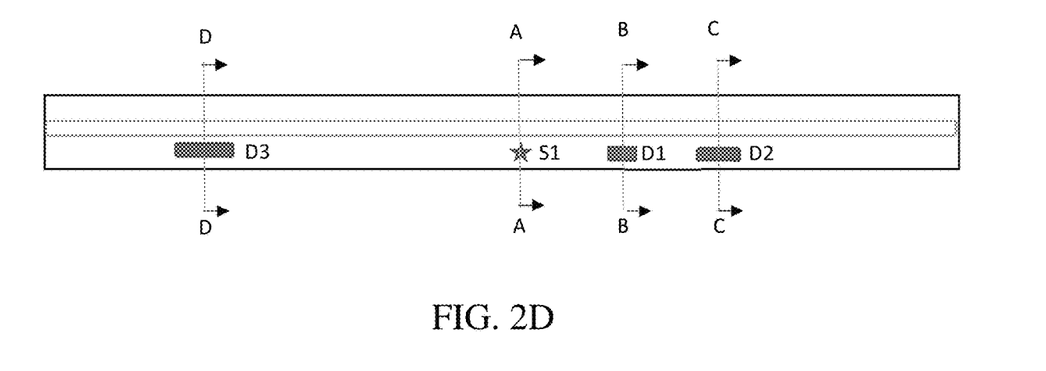

In FIG. 2A, all three detectors reside on one side of the pulsed neutron source along the logging tool 200. The one side can be either the proximal side or the distal side of the pulsed neutron source. The proximal side is the side of the pulsed neutron logging tool 200 that is closer to the surface when it is deployed downhole while the distal side is farther away from the surface. The high voltage power supply provides power to detectors (D1, D2, D3) and to the pulsed neutron source (S1). The signals from detectors are processed by the electronic instruments while measurements/data are collected and transmitted by telemetry. In FIGS. 2B, 2C, and 2D, both the distal side and the proximal side of the pulsed neutron source has at least one detector disposed thereto.

In wireline logging, the tool can be installed in a sonde, which does not contain a mud channel. Detectors can be installed either along or off the axis of the tool body. Power and control signals can also be provided to the logging tool from the surface while data from the logging tool can be transmitted to the surface via the wireline cable.

The pulsed neutron source S1 in each logging tool depicted in FIGS. 2A to 2D is a pulsed neutron generator. The pulsed neutron generator may be a Deuterium-Tritium (D-T) pulsed neutron generator, which can be operated in a variety of pulse schematics (e.g., frequency, duty time) in a pulse mode. For example, the frequency of neutron pulses may be about 10 kHz (the period is 100 μs) and the neutron duty time may be about 20 μs. In another embodiment, the frequency of neutron pulses may be about 1 kHz (the period is 1000 μs) and neutron duty time may be about 50 μs. Depending on the methods and measurements, the D-T neutron generator may also be operated in a continuous mode. In that case, the neutron generator is activated frequent enough so that neutrons are emitted continuously. Neutrons from a D-T neutron generator has an initial energy of about 14.1 MeV.

The pulsed neutron source may also be a Deuterium-Deuterium (D-D) pulsed neutron generator, which can be operated in different pulse schematics (e.g., frequency, duty time) in pulsed mode. For example, the frequency of neutron pulses may be about 20 kHz (the period is 50 μs) and neutron duty time may be about 20 μs. Alternatively, the frequency of neutron pulses may be about 1 kHz (the period is 1000 μs) and neutron duty time may be 40 p s. Depending on the methods and measurements, the D-D neutron generator may also be operated in a continuous mode. Neutrons from a D-D neutron generator has an initial energy of about 2.5 MeV.

The neutron source S1 and detectors D1, D2, and D3 as depicted in FIGS. 2A-2D only show their relative positions along the longitudinal direction of the housing of the tool 200 but not their positions in the radial direction in a cross-section of the tool housing.

Figure 3A:
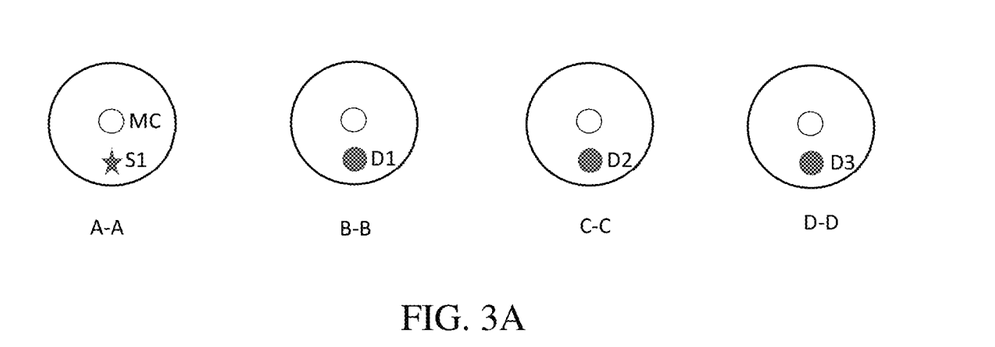
FIG. 3A, FIG. 3B, and FIG. 3C show cross-sectional views of exemplary pulsed neutron logging tools having S1, D1, D2, and D3.
Figure 3B:
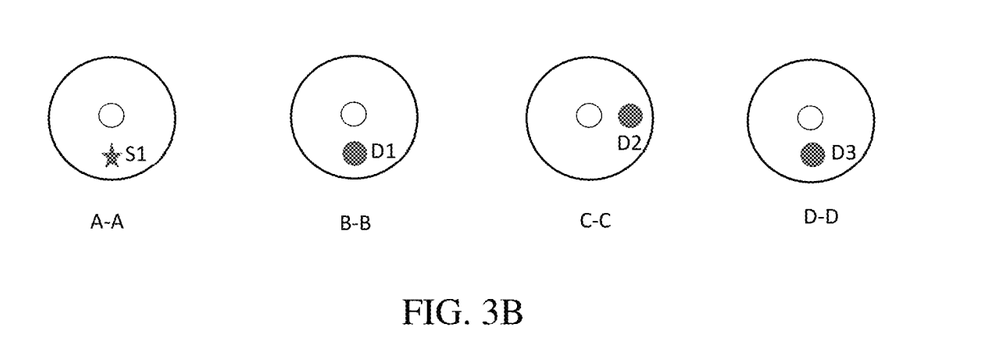
Figure 3C:
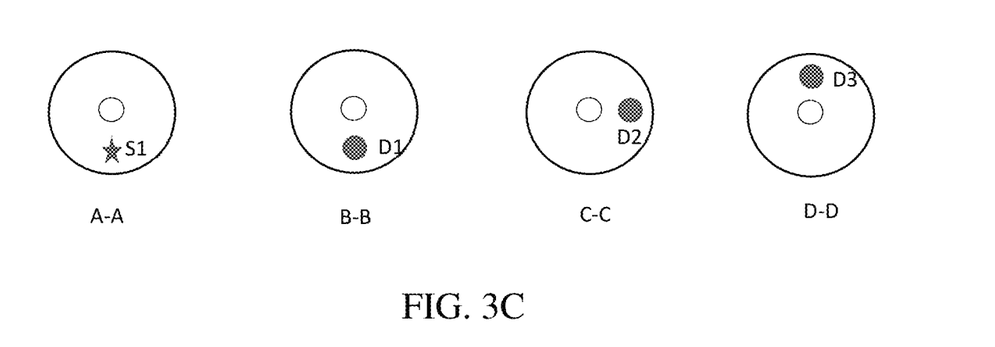

In certain embodiments, S1, D1, D2, and D3 can be disposed at the same radial or different radial directions, i.e., having the same or different toolface angles when deployed in the formation. FIGS. 3A, 3B, and 3C show exemplary cross-sectional views in the directions of A-A, B-B, C-C, and D-D, respectively. S1, D1, D2, and D3 in FIG. 3A are disposed at same toolface angle. In FIG. 3B, however, S1, D1, and D3 have the same toolface angle while D2 is at a different toolface angle. In FIG. 3C, S1 and D1 have the same toolface angle while each of D2 and D3 has a different toolface angle.

Figure 4A:
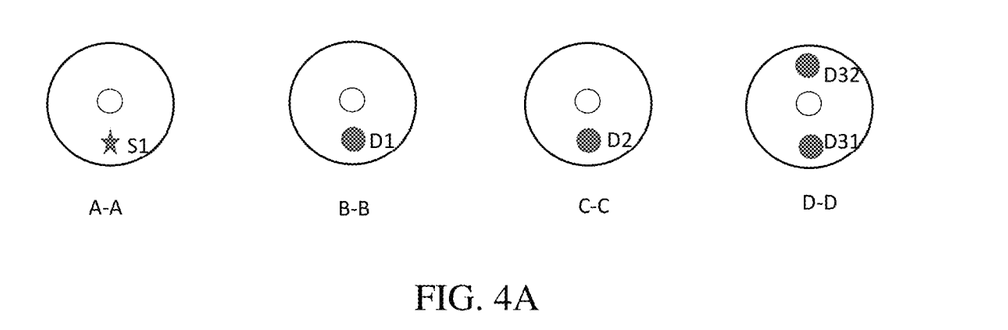
FIG. 4A and FIG. 4B show cross-sectional views of exemplary pulsed neutron logging tools having four (D1, D2, D31, D32) and six detectors (D1, D21, D22, D31, D32), respectively.
Figure 4B:
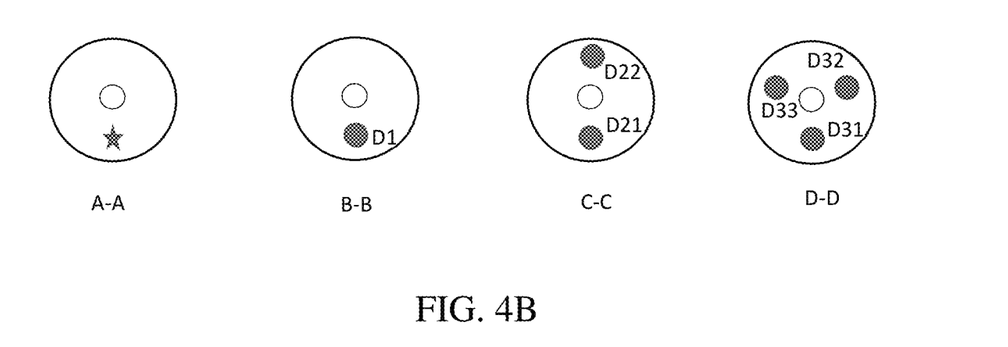

Other embodiments of the logging tool may have more than three detectors. For example, FIG. 4A depicts a variation of the logging tool in FIG. 2A that has four detectors—D1, D2, D31, and D32. D31 and D32 have approximately the same distance from S1 but are disposed at two different toolface angles. Likewise, FIG. 4B depicts another variation of tool in FIG. 2A, which has six detectors—D1, D21, D22, D31, D32, and D33. In this embodiment, D21 and D22 are disposed opposite to each other on the cross-sectional area of the logging tool, i.e., the toolface angle of D21 and D22 is 0° and 180°, respectively. D31, D32, and D33 are disposed 120° apart on the cross-sectional area of the logging tool, i.e., a difference in the toolface angles of any two among D31, D32, and D33 is 120°. Having different toolface angles allows detectors to preferentially receive neutrons and gamma-rays at certain incident angles from the formation. It also increases the detection efficiency of neutrons and gamma rays by increasing the total count rate of all the detectors.

Further, in FIG. 4A, D31 and D32 have substantially the same distance from S1. In FIG. 4B, middle detectors D21 and D22 have substantially the same distance from S1 while far detectors D31, D32, and D33 have substantially the same distance from S1. "Substantially the same distance" means the distances from S1 to the center of scintillators of the detectors (e.g., D31 and D32) is about the same. For example, the difference is less than ½" or ¼". By this arrangement, multiple middle detectors collectively or multiple far detectors collectively have higher count rates than when one only middle detector or only one far detector is used. Accordingly, the pulsed neutron source S1 can be of a less powerful source so it may not be subject to stringent regulations as more powerful neutron sources are subject to. In addition, the count rate of individual detectors can be recorded and processed separately. The differences of various detectors in distance and in toolface angles can be used to obtain formation information in specific azimuthal directions.

In some embodiments, the logging tool 200 have multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb neutrons and gamma rays from certain directions.

The shield is made of or contains one or more materials that can effectively attenuate both thermal neutrons and gamma rays. The shield material can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 5:
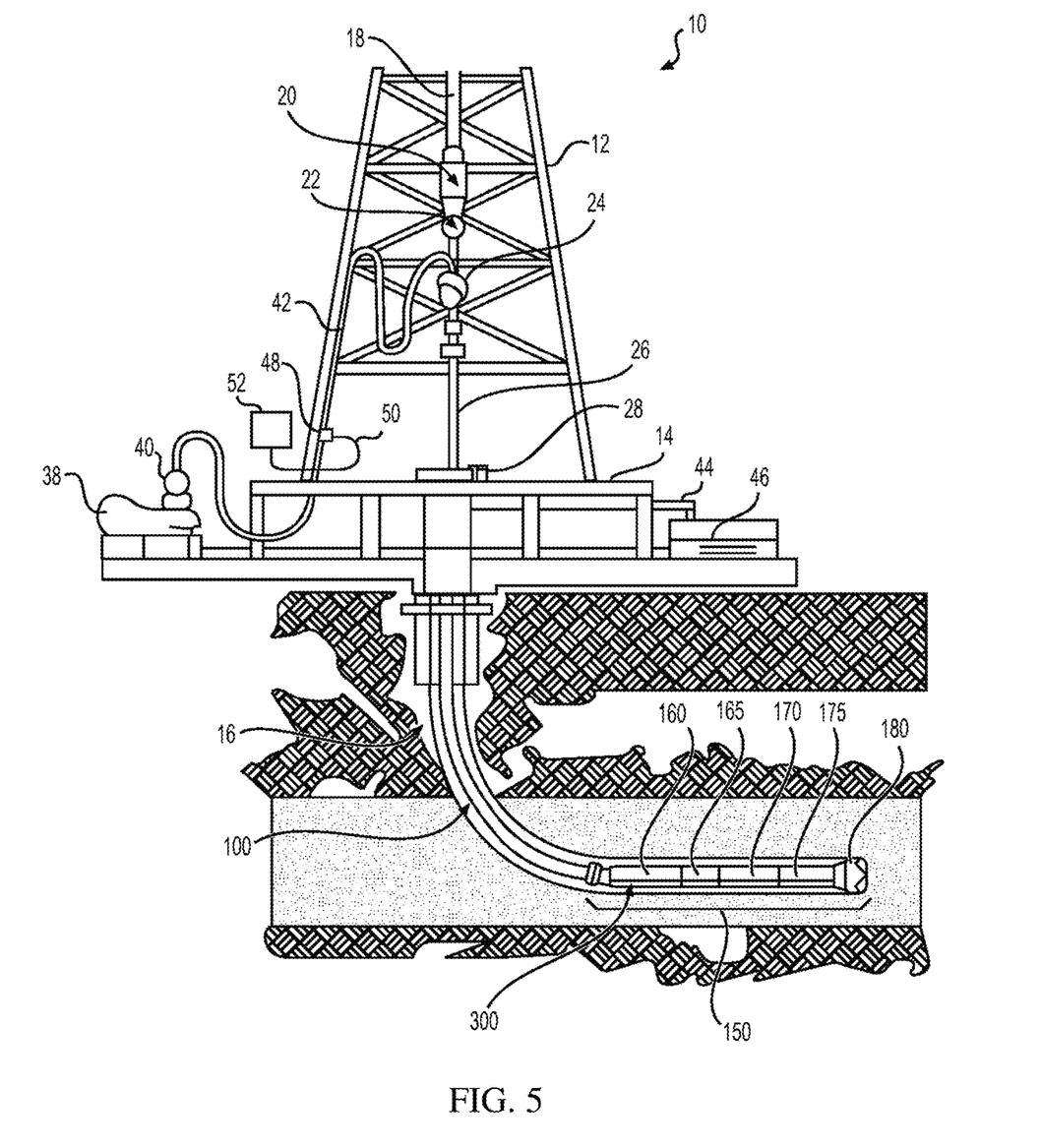
FIG. 5 is a block diagram of an exemplary drilling system that is suitable for implementing the present disclosure.

The logging tool 200 can be a part of a wireline logging tool or be included in a downhole assembly as a LWD logging tool in a drilling operation. FIG. 5 is a diagram of an oil drilling system used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the bore hole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the bore hole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder which decodes the electrical signals and transmits the decoded signals to a surface computer 52 which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instruments sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the bore hole 16. The drilling fluid carries the cuttings up from the bore hole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (bore hole trajectory), etc. The pulsed neutron logging tool 200 and associated electronic components may be located in LWD instrument sub 165. The pulsed neutron logging tool 200 and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The pulsed neutron logging tool 200 may alternatively been installed in the near-bit measure sub 175 to provide more accurate real-time formation parameters to guide directional drilling. The data may be transmitted through the cable embedded in the downhole motor 170 to the MWD system 160 in the bottom whole assembly 150.

Figure 6:
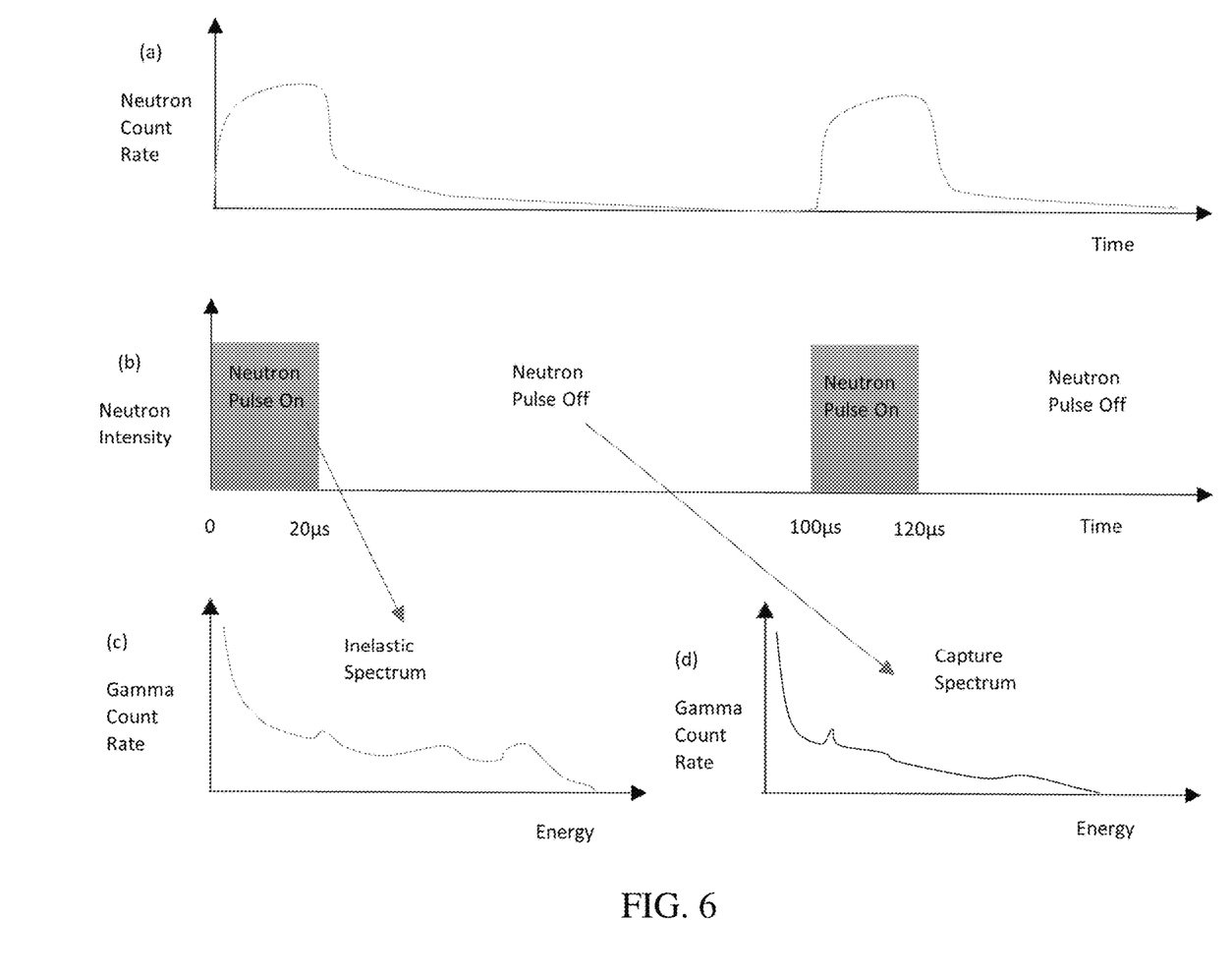
FIG. 6 shows schematics of neutron pulses, neutron count rates, as well as inelastic spectrum and capture spectrum of neutron-induced gamma rays.

In one embodiment of the current disclosure, a variety of formation parameters obtained using a logging tool having a D-T neutron generator and three dual-function detectors. FIG. 6 shows schematics of neutron pulses, neutron count rates, as well as inelastic spectrum and capture spectrum of neutron-induced gamma rays. The frequency of neutron pulses is 10 kHz (the period is 100 µs) and the neutron duty time is 20 µs, as shown in FIG. 6, panel (b).

The neutron count rates measured by the dual-function detectors, shown in FIG. 6, panel (a), are utilized to obtain formation porosity and other formation parameters. Neutrons from the dual-function detector may be further separated according to whether the neutron pulse is ON or OFF, which serves as a coincident or anti-coincident signal to neutrons from the three detectors so that during the neutron pulses (neutron pulse is ON), neutrons are recorded mainly as fast neutrons. Between the neutron pulses (neutron pulse is OFF), neutrons are recorded as thermal neutrons. Fast neutrons and thermal neutrons recorded at three detectors can be used to obtain fast neutron space distribution and thermal neutron space distribution. The neutrons from each detector may also be recorded together. In that case, all neutrons (from thermal neutrons to fast neutrons) are used to obtain the neutron space distribution.

Gamma rays from the dual function may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic spectrum, shown in FIG. 6, panel (c). Between the neutron pulses (neutron pulse is OFF), gamma rays are recorded as capture spectrum, shown in FIG. 6, panel (c). Proper time windows are selected so that gamma rays measured in the capture time window are from thermal neutron capture reactions and most gamma rays measured in the inelastic time window are from fast neutron inelastic scattering.

Background noises received by detectors may be measured after the neuron generator is OFF for some time and can be subtracted from the total signals from either neutrons or gamma rays. Neutron background noises measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

The capture gamma ray count rates measured by the dual-function detectors after background subtraction can also be utilized to obtain formation porosity and other formation parameters.

In an exemplary embodiment, a logging tool 200 having one neutron source and three dual function detectors—the near detector, the middle detector, and the far detector—is used to measure formation porosity ($\Phi$). FIGS. 2A, 2B, 2C, or 2D are examples of such a logging tool 200. Further, the neutron source can be a pulsed neutron source or an isotope neutron source.

The logging tool 200 is lowered into a wellbore to carry out nuclear logging, either in a sonde for wireline logging or as a part of LWD instruction in a drill string. Each of the far, middle, and near detectors detects neutrons and neutron-induced gamma rays. Detector signals from neutrons and neutron-induced gamma rays are distinguished using a pulse shape discrimination (PSD) technique.

The neutron signals from the three detectors are then utilized to obtain the total count rates ($CRN_n$ for the near detector, $CRN_m$ for the middle detector, $CRN_f$ for the far detector), fast neutron count rates ($CRFN_n$ for the near detector, $CRFN_m$ for the middle detector, $CRFN_f$ for the far detector), thermal neutron count rates ($CRTN_n$ for the near detector, $CRTN_m$ for the middle detector, $CRTN_f$ for the far detector). During short neutron pulses, there are fast neutrons and thermal neutrons. Between neutron pulses, most neutrons are thermal neutrons. However, the dual-function detectors are more sensitive to thermal and epithermal neutrons so that a significant amount of neutrons detected by the detectors are thermal and epithermal neutrons. Therefore, either the count rates of thermal neutrons, epithermal neutrons, or thermal and epithermal neutrons (total neutrons) from the dual-function detectors can be utilized to obtain the formation porosity.

Thermal neutrons are neurons with a kinetic energy from about 0.025 eV (at room temperature) to 0.4 eV. Epithermal neutrons are neutron with kinetic energy from 0.4 eV to 10 eV. Fast neutrons are neutrons with kinetic energy higher than 1 MeV.

To measure epithermal neutrons, a thin layer of a thermal neutron absorber, such as cadmium (Cd) or gadolinium (Gd), is used to wrap detectors so that thermal neutrons scattered back from the formation are absorbed before entering the detectors.

The three ratios of the total neutron count rates may be obtained according to according to Equations 1 to 3:

$$Rn_{m/f} = \frac{CRN_m}{CRN_f} \quad (1)$$

$$Rn_{n/f} = \frac{CRN_n}{CRN_f} \quad (2)$$

$$Rn_{n/m} = \frac{CRN_n}{CRN_m} \quad (3)$$

$Rn_{m/f}$ is the middle-to-far ratio, $Rn_{n/f}$ is the near-to-far ratio, and $Rn_{n/m}$ is the near-to-middle ratio. Since the three detectors are placed at different distances from the neutron source, they have different depth of investigations. As a result, near-wellbore environments, such as borehole fluid, cement, etc., have different impacts on the three ratios. $Rn_{m/f}$ is more sensitive to the formation, $Rn_{n/m}$ is more sensitive to the near-wellbore material, such as the wellbore fluid, and $Rn_{n/f}$ is sensitive to both.

In one embodiment of the current disclosure, the neutron porosities (<Dn) can be obtained by processing the three ratios ($Rn_{n/m}$, $Rn_{n/f}$, $Rn_{m/f}$) and mineralogy into a trained neural network.

The three ratios of capture gamma ray count rates may be calculated according to Equations 4 to 6:

$$Rg_{m/f} = \frac{CRg_m}{CRg_f} \quad (4)$$

$$Rg_{n/f} = \frac{CRg_n}{CRg_f} \quad (5)$$

$$Rg_{n/m} = \frac{CRg_n}{CRg_m} \quad (6)$$

$Rg_{m/f}$ is the middle-to-far ratio, $Rg_{n/f}$ is the near-to-far ratio, and $Rg_{n/m}$ is the near-to-middle ratio. Since the three detectors are placed at different distances from the neutron source, they have different depth of investigations. As a result, near-wellbore environments, such as borehole fluid, cement, etc., have different impacts on the three ratios. $Rg_{m/f}$ is more sensitive to the formation, $Rg_{n/m}$ is more sensitive to the near-wellbore material, such as the wellbore fluid, and $Rg_{n/f}$ is sensitive to both.

In another embodiment of the current disclosure, the gamma porosities ($\Phi_g$) can be obtained by processing the three ratios ($Rg_{n/m}$, $Rg_{n/f}$, $Rg_{m/f}$) and mineralogy into a trained neural network.

In yet another embodiment of the current disclosure, the formation porosity ($\Phi$) can be obtained by combining the neutron porosity ($\Phi_n$) and the gamma porosities ($\Phi_g$). $\Phi_n$ and $\Phi_g$ complement each other in porosity measurement. For example, $\Phi_n$ is more sensitive to lower porous formation, e.g., porosity of 40% or less, while $\Phi_g$ is more accurate at higher formation porosity. Furthermore, $\Phi_n$ may overestimate the porosity while $\Phi_g$ may underestimate the porosity for high salinity fluid. Moreover, $\Phi_g$ is not susceptible to shale effects as $\Phi_n$. Therefore, the combination of $\Phi_n$ and $\Phi_g$ presents an improved porosity reading in a broader range (0-100 p.u.) of formation porosity in a variety of borehole and formation conditions.

In still another embodiment of the current disclosure, the formation porosity ($\Phi$) can be obtained by processing the three ratios ($Rn_{n/m}$, $Rn_{n/f}$, $Rn_{m/f}$) of neutrons, the three ratios ($Rg_{n/m}$, $Rg_{n/f}$, $Rg_{m/f}$) of capture gamma rays and mineralogy into a trained neural network.

Figure 7:
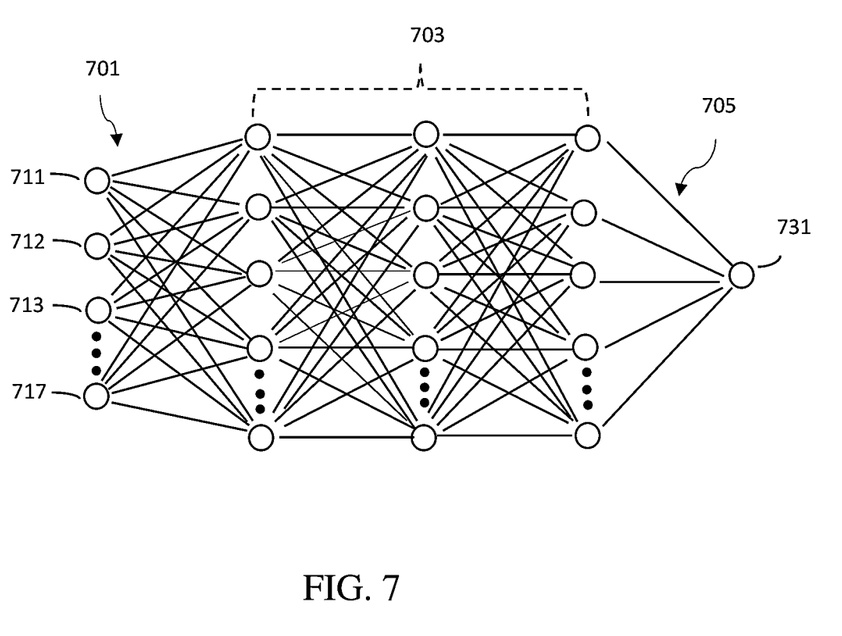
FIG. 7 shows a neural network for estimation of formation porosity according to a first embodiment of the present disclosure.
Figure 8:
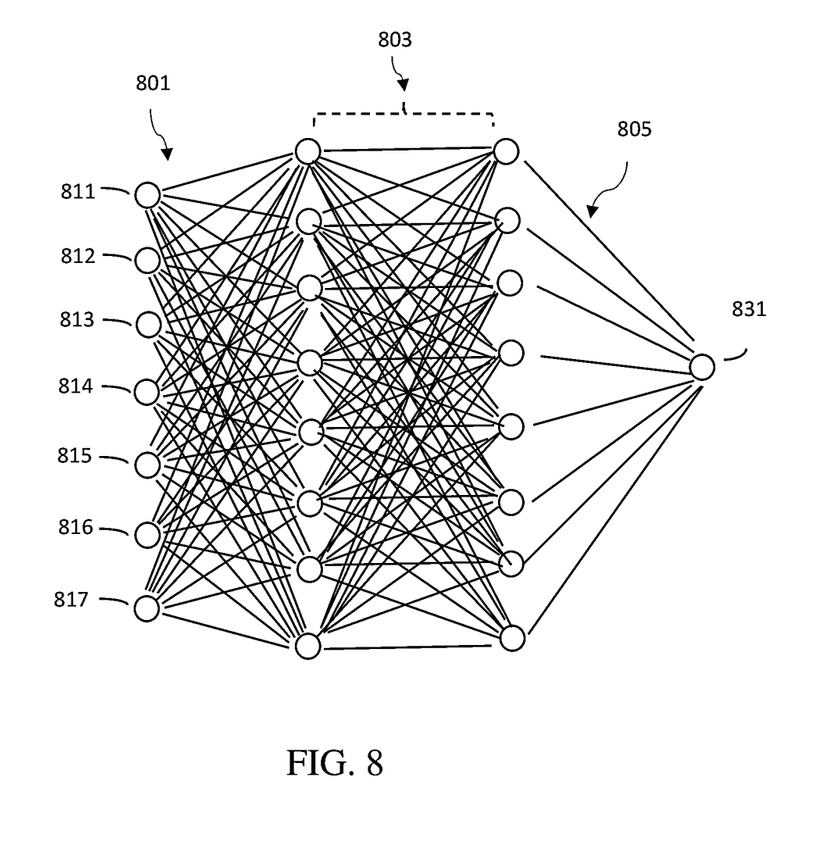
FIG. 8 shows a neural network for estimation of formation porosity according to a second embodiment of the present disclosure.

Methods to estimate formation porosity using artificial neural networks are illustrated in FIG. 7 and FIG. 8.

FIG. 7 illustrates a simple neural network having an input layer 701, a middle layer 703, and an output layer 705. In this embodiment, the input layer 701 includes inputs 711 to 717. When ratios of neutron count rates are used to estimate formation porosity, inputs 711 to 717 includes three ratios of neutron count rates ($Rn_{n/m}$, $Rn_{n/f}$, and $Rn_{m/f}$), mineralogy type, such as sandstone, limestone or dolomite, and three environmental variables selected from borehole size, tool standoff, salinity of borehole fluid, density of borehole fluid, temperature, and pressure of formation, etc. As the neutron count rates account for some of the environmental effects, it is not necessary to consider all environmental variables in order to obtain an accurate formation porosity. For example, three of six environmental variables having more impact on the formation porosity, such as borehole size, tool standoff, salinity of borehole fluid, may be used as inputs to obtain an accurate formation porosity. The middle layer 703 is the hidden layer, which may contain one, two, or multiple layers. The processors (nodes) in each middle layer can be weighted linear or nonlinear regressions. The outputs from processors (nodes) in a proceeding layer serve as the inputs to the following layer. The final output 731 from the output layer 705 is an estimated formation porosity ($\Phi_n$) from neutron signals. Training is provided to match the output 731 to the known formation porosity. Once the neural network has been trained and tested, the porosity for new subterranean formations can be estimated based on the trained neural network using neutron count ratio, minerology, as well as three environmental variables.

The neural network in FIG. 7 can also use ratios of capture gamma ray count rates to estimate formation porosity. In this case, the inputs to the input layer in FIG. 7 may contain the three ratios of capture gamma ray count rates ($Rg_{n/m}$, $Rg_{n/f}$, and $Rg_{m/f}$) from three detectors, mineralogy information, such sandstone, limestone or dolomite, and three environmental variables amongst borehole size, tool standoff, salinity of borehole fluid, density of borehole fluid, temperature, and pressure of formation, etc. In this embodiment, three of six environmental variables that has more impact on the formation porosity, namely, borehole size, tool standoff, salinity of borehole fluid, are used as inputs to obtain the formation porosity. The output 731 from the output layer 705 is an estimated formation porosity ($\Phi_g$) based on gamma ray signals. Training is provided to match the output 731 to the known formation porosity.

$\Phi_n$ and $\Phi_g$ can be used to cover different ranges of the formation porosity. Further, this method provides flexibility in training the neural network or in estimating formation porosity if historical data is only available in $\Phi_n$ or $\Phi_g$. That is, the historical $\Phi_n$ can be first correlated with current $\Phi_n$. The correlation thus obtained may be used to convert or adjust current $\Phi_g$ to derive $\Phi_g$ values that correspond to historical $\Phi_n$, or vice versa. Note that historical data may be from a formation different from the formation currently under nuclear logging investigation.

FIG. 8 illustrates another neural network, which have an input layer 801, a middle layer 803, and an output layer 805. In this embodiment, the input layer 801 includes inputs 811 to 817, which include three ratios of neutron count rates ($Rn_{n/m}$, $Rn_{n/f}$, and $Rn_{m/f}$), the three ratios of capture gamma ray count rates ($Rg_{n/m}$, $Rg_{n/f}$, and $Rg_{m/f}$) from three detectors, and mineralogy information. Although one may input environmental variables into the neural network, it is not necessary to do so in this method. Since six of inputs 811 to 817 are neutron count ratios or gamma ray count ratios, most of the environmental effects have already been accounted for. Accordingly, it is not necessary to use any environmental variable in order to obtain an accurate formation porosity. Similar to the neural network depicted in FIG. 7, the middle layer 803 is hidden layer, which may contain one or more layers. The processors (nodes) in each layer can be weighted linear or nonlinear regressions. The outputs of nodes in the proceeding layer are the inputs of nodes of the layer that follows. The output of the output layer 805 is an estimated formation porosity, based on three ratios of neutron count rates from the three detectors, three ratios of capture gamma ray count rates from the three detectors, and mineralogy type.

When training the neural network, such as those in FIG. 7 or FIG. 8, a set of input values of a sample formation with known porosity value are inputted into the input layer. The output from the output layer is compared the known porosity of the sample formation. The weight at each of the processors is adjusted to improve the matching between the output and the known porosity value for each sample. The training is complete when convergence is reached, e.g., when the incremental change in the weights is beneath a predetermined threshold level, or after a given number of samples have been processed. An exemplary predetermined level can be ±0.5 pu below 20 p.u. or ±5% above 20 p.u A plurality of samples (i.e., "training set") can be used used in training to arrive at a well-trained neural network. For example, the weights obtained from a first training stay fixed, and the training set are processed using the neural network with the fixed weights obtained during the first training. If a good agreement is observed between predicted and actual porosities in the training set, then the neural network is considered well-trained. The well-trained neural network is installed in the processor of the bottom hole assembly or data processing system on the surface for use during logging or drilling operations. If good agreement is not noted in the test sets between the neural network outputs and the actual porosities, then further training is carried out until the neural network becomes well-trained.

Figure 9:
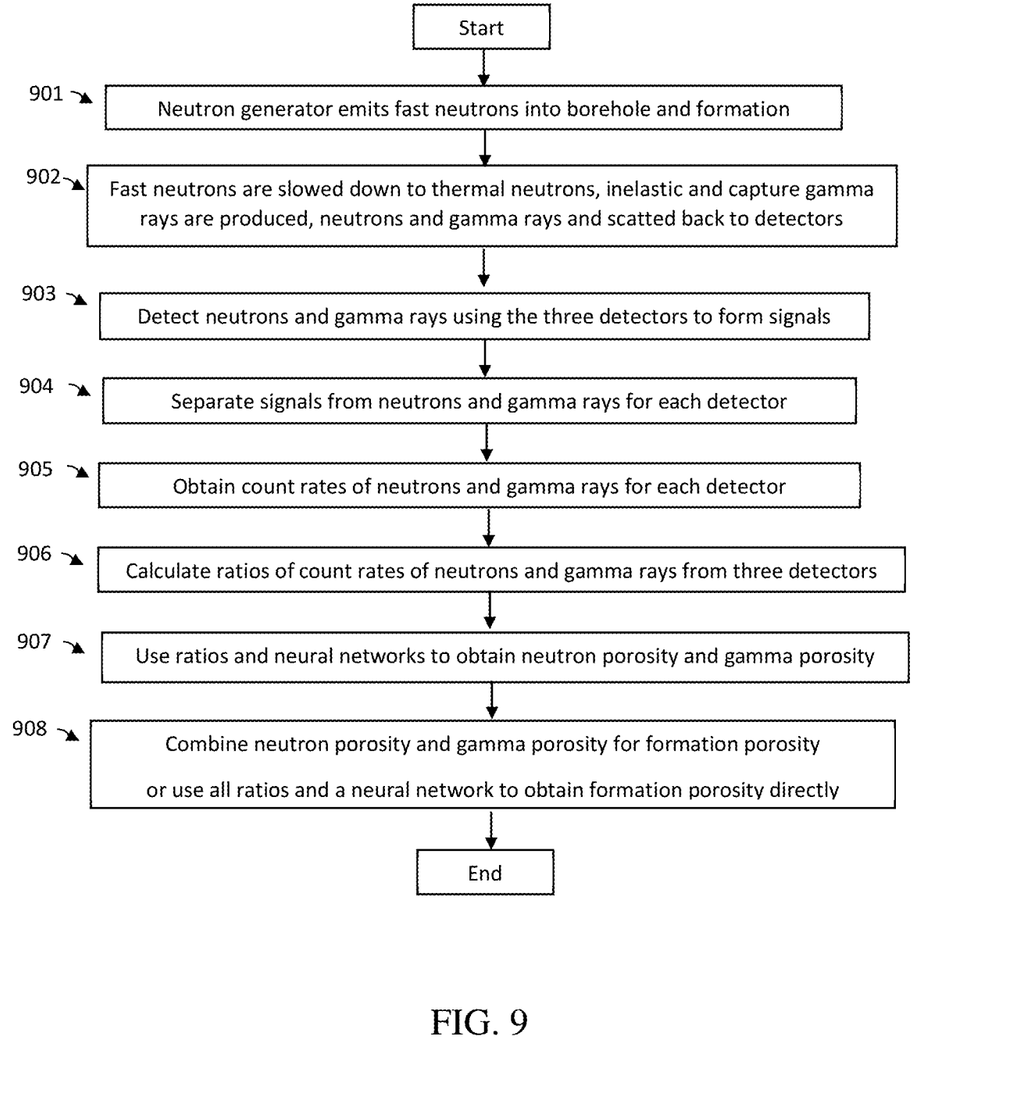
FIG. 9 shows a workflow for estimating of formation porosity according to an embodiment of the present disclosure.

An exemplary workflow for obtaining improved formation porosities with different depth of investigation using a tool having a pulsed neutron generator and three detectors is illustrated in FIG. 9. In Step 901, a pulsed neutron generator emits fast neutron pulses, which enter borehole and formation. In Step 902, fast neutrons are slowed down to thermal neutrons by inelastic scattering, elastic scattering with the near-wellbore material, such as wellbore and formation. Some thermal neutrons get captured by elements in wellbore and formation and capture gamma rays are produced. In Step 903, some neutrons and gamma rays are scattered back to and received by the three detectors. In Step 904, neutrons and gamma rays signals from each detector are separated, e.g., using PSD. In Step 905, count rates of either thermal neutrons, epithermal neutrons, or both, and capture gamma rays are obtained for each detector. In Step 906, ratios of count rates of thermal neutrons, epithermal neutrons or both thermal and epithermal neutron, and gamma rays from three detectors are calculated. In Step 907, neutron porosity and gamma porosity are obtained by using ratios of neutrons and gamma rays respectively as inputs of a neural network. In Step 908, neutron porosity and gamma porosity are combined to cover the full range of formation porosity or use all ratios of neutrons and gamma rays and a neural network to obtain formation porosity directly in the entire porosity measurement range (0-100 p.u.).

The pulsed neutron source, detectors, electronic modules, signals, and above methodologies in the logging tool can be controlled and processed by hardware, software, firmware, or any combination thereof. The firmware is a specific class of computer software that provides the low-level control for the logging tool's specific hardware and components. It may contain a basic function of a component, such as such to separate a neutron signal from a gamma signal, or to fit a time decay curve of thermal neutrons or capture gamma rays and to obtain an apparent borehole sigma and an apparent formation sigma from a detector. It may also perform data manipulation functions, such as to obtain neutron-induced borehole sigma and neutron-induced formation sigma, or gamma-induced borehole sigma and gamma-induced formation sigma, or to obtain true borehole sigma and true formation sigma using embedded software inside the tool components. It may also perform data control, save data in tool memories, and transmit data to the surface for further processing or displaying.

It should be noted that the method of the present disclosure is not limited to the example shown. The method is applicable of either using a variety of environmental variables, such as standoff, borehole size, mud weight, temperature, pressure, borehole salinity as inputs or not using the environmental variables at all, as inputs for the neural network. Furthermore, more than one hidden layer can be used. That is, all the effects from those environmental factors can be automatically corrected by employing multiple dual-function detectors that detect both neutrons and gamma rays. The method can be used for obtaining formation porosity by using ratios of thermal neutrons, epithermal neutrons, or thermal and epithermal neutrons. The method can be used in both wireline and logging while drilling environments.

Throughout the drawings and the detailed description, unless otherwise described, the same drawing reference numerals will be understood to refer to the same elements, features, and structures. The relative size and depiction of these elements may be exaggerated for clarity, illustration, and convenience.

What is claimed is:

1. A method for evaluating downhole formation porosity, comprising:
   deploying a pulsed neutron logging tool into a well bore in an earth formation;
   emitting neutrons from the pulsed neutron logging tool into the earth formation;
   detecting neutrons and gamma rays using a plurality of detectors in the pulsed neutron logging tool;
   determining ratios of neutron count rates and ratios of gamma ray count rates amongst the plurality of the detectors;
   inputting the ratios of neutron count rates, the ratios of gamma ray count rates, or both to a neural network to obtain one or more formation porosities,
   wherein each of the plurality of detectors is a dual-function detector configured to detect neutrons and gamma rays from the earth formation.

2. The method of claim 1, wherein the pulsed neutron source is utilized to generate neutrons in pulse mode.

3. The method of claim 1, wherein neutrons detected by the plurality of detectors are selected from thermal neutrons, epithermal neutrons, and a mixture thereof.

4. The method of claim 1, wherein gamma rays detected by the plurality of detectors are selected from inelastic gamma rays, capture gamma rays, and a mixture thereof.

5. The method of claim 1, further comprising separating a signal from a neutron and a signal from a gamma ray by each of the plurality of detectors using pulse shape discrimination technique.

6. The method of claim 1, comprising inputting the ratios of neutron count rates and a plurality of formation parameters into the neural network; and calculating a first formation porosity.

7. The method of claim 6, wherein the plurality of parameters are selected from a borehole size of the well bore, a tool standoff of the pulsed neutron logging tool, a salinity fluid in the well bore, a temperature of the well bore, a pressure of the well bore, and a mineralogy of the earth formation.

8. The method of claim 1, comprising inputting the ratios of gamma ray rates and a plurality of formation parameters into the neural network; and calculating a second formation porosity.

9. The method of claim 8, wherein the plurality of parameters are selected from a borehole size of the well bore, a tool standoff of the pulsed neutron logging tool, a salinity fluid in the well bore, a temperature of the well bore, a pressure of the well bore, and a mineralogy of the earth formation.

10. The method of claim 1, comprising inputting the ratios of neutron count rates, the ratios of gamma ray count rates, and one or more parameters to the neural network to obtain the formation porosity.

11. The method of claim 10, wherein the one or more parameter is a mineralogy of the earth formation.

12. The method of claim 1, wherein the pulsed neutron logging tool has three or more detectors.

13. The method of claim 12, wherein the three or more detectors include a first detector disposed at a first distance from the neutron source, a second detector disposed at a second distance from the neutron source, a third detector disposed at a third distance from the neutron source, wherein the second distance is longer than the first distance, and the third distance is longer than the second distance.

14. The method of claim 1, further comprising training the neural network using a testing set.

15. The method of claim 1, wherein a pulsed neutron source in the pulsed neutron logging tool can be a Deuterium-Tritium (D-T) neutron generator, or a Deuterium-Deuterium (D-D) neutron generator.

16. The method of claim 1, wherein each of the plurality of dual-function detectors in the pulsed neutron logging tool comprises a scintillator made of $Cs_2LiLaBr_6$.

17. The method of claim 1, wherein the data of neutron count rates, gamma ray count rates, ratios of neuron count rates, ratios of gamma ray count rate are further processed by the firmware inside the pulsed neutron logging tool or transmitted to surface.

* * * * *